United States Patent
Hsu et al.

[11] Patent Number: 6,151,200
[45] Date of Patent: Nov. 21, 2000

[54] METHOD OF DISCHARGING SOI FLOATING BODY CHARGE

[75] Inventors: Louis L. Hsu, Fishkill; Jente B. Kuang, Poughkeepsie, both of N.Y.; Somnuk Ratanaphanyarat, Palo Alto, Calif.; Mary J. Saccamango, Poughquag, N.Y.

[73] Assignee: International Business Machines Corporation, Armonk, N.Y.

[21] Appl. No.: 09/452,934

[22] Filed: Dec. 2, 1999

Related U.S. Application Data

[62] Division of application No. 09/035,407, Mar. 5, 1998, Pat. No. 6,078,058.

[51] Int. Cl.$^7$ ...................................................... H02H 9/00
[52] U.S. Cl. ............................ 361/56; 361/91.1; 361/111; 361/118
[58] Field of Search ............................. 361/56, 91.1, 111, 361/115, 118, 119, 58, 127

[56] References Cited

U.S. PATENT DOCUMENTS

| | | | |
|---|---|---|---|
| 3,990,056 | 11/1976 | Luisi et al. | 340/173 R |
| 4,006,458 | 2/1977 | Booher | 340/147 |
| 4,169,233 | 9/1979 | Haraszti | 307/355 |
| 4,253,162 | 2/1981 | Hollingsworth | 365/175 |
| 4,989,057 | 1/1991 | Lu | 357/23.7 |
| 5,040,037 | 8/1991 | Yamaguchi et al. | 357/23.7 |
| 5,382,818 | 1/1995 | Pein | 257/347 |
| 5,420,055 | 5/1995 | Vu et al. | 437/40 |
| 5,448,513 | 9/1995 | Hu et al. | 365/150 |
| 5,489,792 | 2/1996 | Hu et al. | 257/347 |
| 5,498,882 | 3/1996 | Houston | 257/57 |
| 5,594,371 | 1/1997 | Douseki | 326/119 |
| 6,078,058 | 6/2000 | Hsu et al. | 257/48 |

*Primary Examiner*—Stephen W. Jackson
*Attorney, Agent, or Firm*—Ratner & Prestia; Joseph P. Abate

[57] ABSTRACT

Apparatus and method for discharging the body of a monitored SOI device through first and second discharge circuits. The second discharge circuit is selectively activated when the body potential of the monitored SOI device is at a level such that the body charge of the monitored SOI device cannot be discharged entirely through the first discharge circuit within normal operating cycle time allowances.

5 Claims, 3 Drawing Sheets

METHOD OF DISCHARGING SOI FLOATING BODY CHARGE

This application is a divisional of U.S. patent application Ser. No. 09/035,407, filed on Mar. 5, 1998, now U.S. Pat. No. 6,078,058, which has been allowed.

FIELD OF THE INVENTION

The present invention relates to monitoring and controlling the body charge which accumulates on a monitored silicon-insulator (SOI) device such as an SOI transistor and, more particularly, to enabling a discharge circuit for that charge if the charge exceeds some predetermined level.

BACKGROUND

SOI complementary metal-oxide-semiconductor (CMOS) transistors have many advantages over conventional transistors such as bulk CMOS transistors. An SOI transistor suffers, however, from one inherent flaw. The floating body of the SOI transistor can develop a body charge over time. The amount of such body charge will depend on the potentials at the source, drain and gate of the SOI transistor. Generally, the highest amount of charging will occur when the gate is off and both the source and drain are biased at the same high potential. Given enough time and/or potential at the source and drain, the body charge of the SOI transistor will eventually reach a saturation level.

The accumulation of body charge on an SOI transistor creates a problem. During subsequent switching of the source or drain of the SOI transistor, the body charge will eventually be discharged by means of a transient bipolar current. This discharge, in turn, can create a number of additional problems, depending on the application in which the SOI transistor is used. First, a discharge of transient bipolar current can cause speed degradation for an initial cycle in some types of SOI circuits such as wide multiplexer configurations (e.g., long array bitlines, multiplexers with virtual grounds, OR/NOR gates). Second, such discharge can cause functionality errors depending on the amount of time required to remove the body charge. This time will generally depend on the size and number of devices serving as parallel discharge paths to ground. For example, the errors are generally more pronounced for nFETs (n-field effect transistors) serving as paths to ground when the common sources and drains, as well as the nFET bodies themselves, are initially charged to a high potential and subsequently discharged at the common node. This is due to the inherent higher current gains of a parasitic npn transistor. Following an initial cycle discharge, this effect will be seen again if the SOI transistor bodies have enough time to charge again. This body charging behavior, which saturates on the order of milliseconds, is unique to SOI devices. The added uncertainty of initial conditions in SOI circuits caused by the body charging, makes the circuit behavior dependent on duty cycle, a problem not seen in conventional bulk CMOS circuits.

SUMMARY OF THE INVENTION

The apparatus for discharging a monitored SOI device constructed in accordance with the present invention, includes a first discharge circuit adapted to be coupled to the monitored SOI device and responsive to a control signal through which the body charge of the monitored SOI device is conducted to ground when activated by the control signal. This apparatus also includes a second discharge circuit adapted to be coupled to the monitored SOI device through which the body charge of the monitored SOI device is conducted to ground when selectively activated. The apparatus according to the present invention further includes a monitor system coupled to the second discharge circuit and responsive to the control signal for determining when the body charge of the monitored SOI device reaches a predetermined level, and selectively activating the second discharge circuit when the monitor system has determined that the body charge of the monitored SOI device has reached the predetermined level.

BRIEF DESCRIPTION OF THE DRAWING

The invention is best understood from the following detailed description when read in connection with the accompanying drawing. Included in the drawing are the following figures.

DETAILED DESCRIPTION OF THE INVENTION

Figure 1:
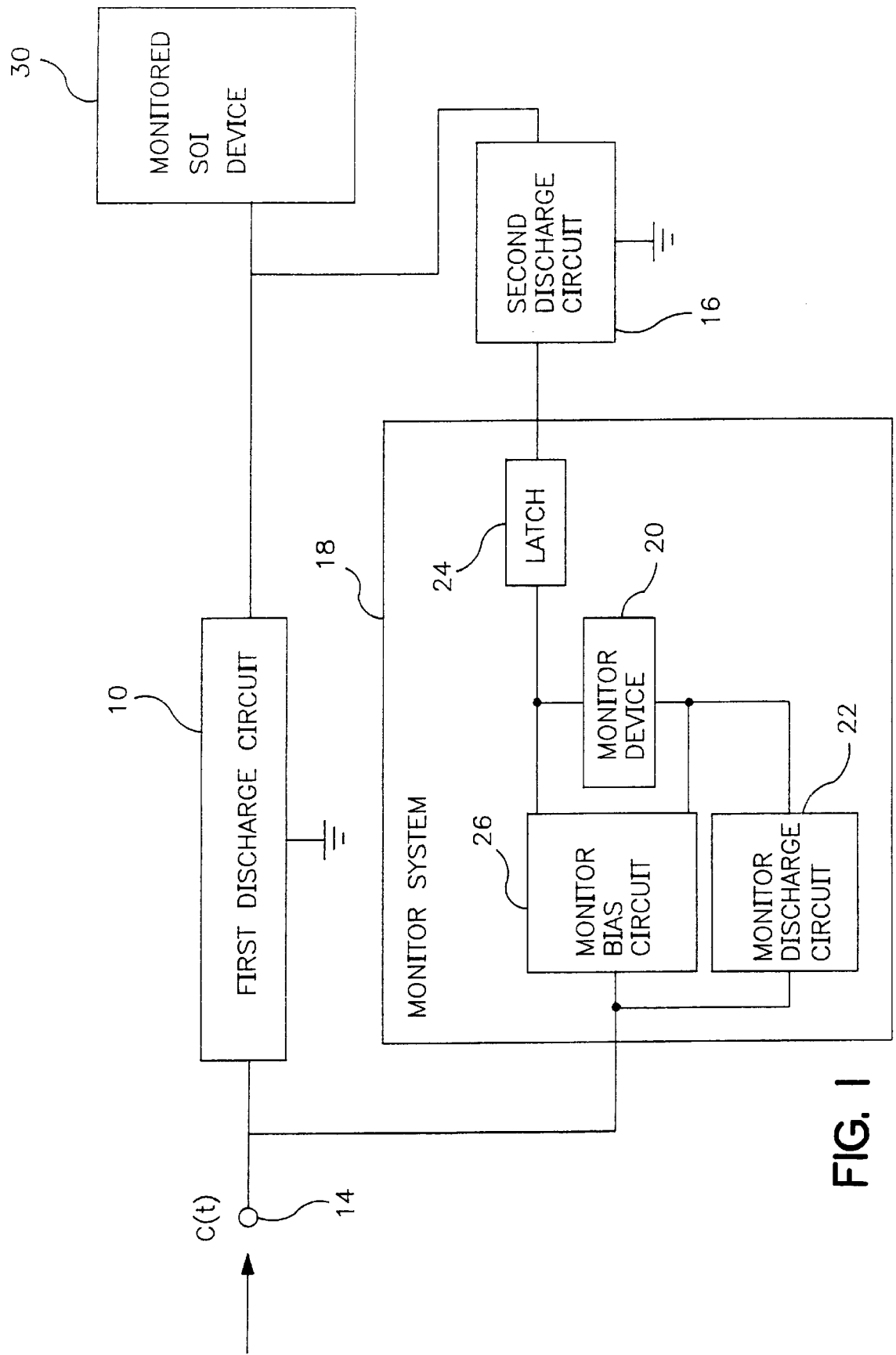
FIG. 1 illustrates an apparatus for discharging a monitored SOI device according to a first exemplary embodiment of the present invention.

FIG. 1 illustrates an exemplary embodiment of an apparatus for discharging a monitored SOI device 30 constructed in accordance with the present invention. Monitored SOI device 30 may include, for example, a single SOI transistor having a charged body, a plurality of SOI transistors connected with a common source or drain and having charged bodies, or any configuration of transistors sharing a common node through which the body charges may be discharged. In these examples, the transistor(s) may be configured as various functional logic gates, cells, etc. The apparatus of FIG. 1 includes a first discharge circuit 10 adapted to be coupled to monitored SOI device 30. In one example, where monitored device 30 includes a plurality of SOI transistors sharing a common node, first discharge circuit 10 is coupled to the common source/drain node of the monitored SOI transistors. First discharge circuit 10 is responsive to a control signal C(t) applied at a terminal 14. First discharge circuit 10 discharges the body charge of monitored SOI device 30 by conducting this charge to ground when the first discharge circuit is activated by the control signal. The details of a typical circuit for implementing first discharge circuit 10 will be described below in connection with FIG. 3.

The apparatus for discharging monitored SOI device 30 with charged bodies, constructed in accordance with the present invention, also includes a second discharge circuit 16 adapted to be coupled to monitored SOI device 30. In one example, where monitored device 30 includes a plurality of SOI transistors sharing a common node, first discharge circuit 10 is coupled to the common source/drain node of the monitored SOI transistors. The body charge of monitored SOI device 30 is conducted to ground through second discharge circuit when second discharge circuit 16 is selectively activated. The details of a typical circuit for implementing second discharge circuit 16 will be described below in connection with FIG. 3.

The apparatus for discharging a monitored SOI device 30, constructed in accordance with the present invention, further includes a monitor system 18 coupled to second discharge circuit 16 and responsive to the control signal. Monitor system 18 selectively activates second discharge circuit 16 when monitor system 18 has determined that the body charge of monitored SOI device 30 has reached the predetermined level, provided that the control signal C(t) is active. This predetermined level is typically one at which the body charge of monitored SOI device 30 cannot be conducted to ground entirely by first discharge circuit 10 within a normal operating cycle time allowance.

For the embodiment illustrated in FIG. 1, monitor system 18 includes monitor device 20 with its body charged at a potential which is representative of the body potential of monitored SOI device 30, thereby emulating monitored SOI device 30. Monitor device 20 preferably includes one or more SOI transistors having terminal bias voltages, bias history and hence body potential comparable to monitored SOI device 30. Monitor system 18 also includes a monitor discharge circuit 22 coupled to monitor device 20 and responsive to the control signal. Monitor discharge circuit 22 conducts the body charge of monitor device 20 to ground when activated by the control signal. Monitor system 18 further includes a latch 24 coupled between monitor device 20 and second discharge circuit 16. Latch 24 (i) detects when the body charge conducted to ground through monitor discharge circuit 22 is of an amount comparable to the predetermined level, and (ii) selectively activates second discharge circuit 16. Monitor system 18 may also include a monitor bias circuit 26 coupled to monitor device 20 for setting the body charge of monitor device 20 in response to the control signal, typically by increasing such body charge in a fashion representative of the bias history of the monitored SOI transistor(s).

The control signal applied at terminal 14 has: (i) a first state during which first discharge circuit 10 and second discharge circuit 16 are not activated, and (ii) a second state during which first discharge circuit 10 is activated and second discharge circuit 16 is selectively activated. First discharge circuit 10 is activated during the second state of the control signal such that first discharge circuit 10 continuously allows body charge of the monitored SOI device 30 to be conducted through first discharge circuit to ground while the control signal remains in the second state. Also, during the second state of the control signal, second discharge circuit 16 is selectively activated by monitor system 18 when monitor system 18 has determined that the body potential of monitored SOI device 30 has reached a level which would induce significant parasitic bipolar current, as explained above.

During the first state of the control signal, monitor bias circuit 26 is enabled to set the body potential of monitor device 20 to a level comparable to that of the monitored device, while monitor discharge circuit 22 is not activated. When the control signal switches to the second state, monitor bias circuit 26 is disabled and monitor discharge circuit 22 is activated. By activating monitor discharge circuit 22, the body charge of monitor device 20 is conducted to ground. This discharge, in turn, creates a voltage drop at a node between monitor device 20 and latch 24. When the magnitude of this voltage drop equals or exceeds a threshold required to cause latch 24 to register a logical "0" (or logical "1" depending on the desired polarity of the implementation), latch 24 activates second discharge circuit 16.

This threshold voltage of latch 24 will depend on the physical characteristics of the transistors used to implement latch 24. The predetermined level of body charge and corresponding body potential, accordingly, is determined as a function of this threshold voltage. During the second state of the control signal, if the body of monitor device 20 fails to accumulate a sufficient body charge such that the voltage drop at the node between monitor device 20 and latch 24 exceeds the threshold voltage when monitor discharge circuit 22 is activated, latch 24 will not register the logical "0" and, hence, second discharge circuit 16 will not be activated.

Figure 2:
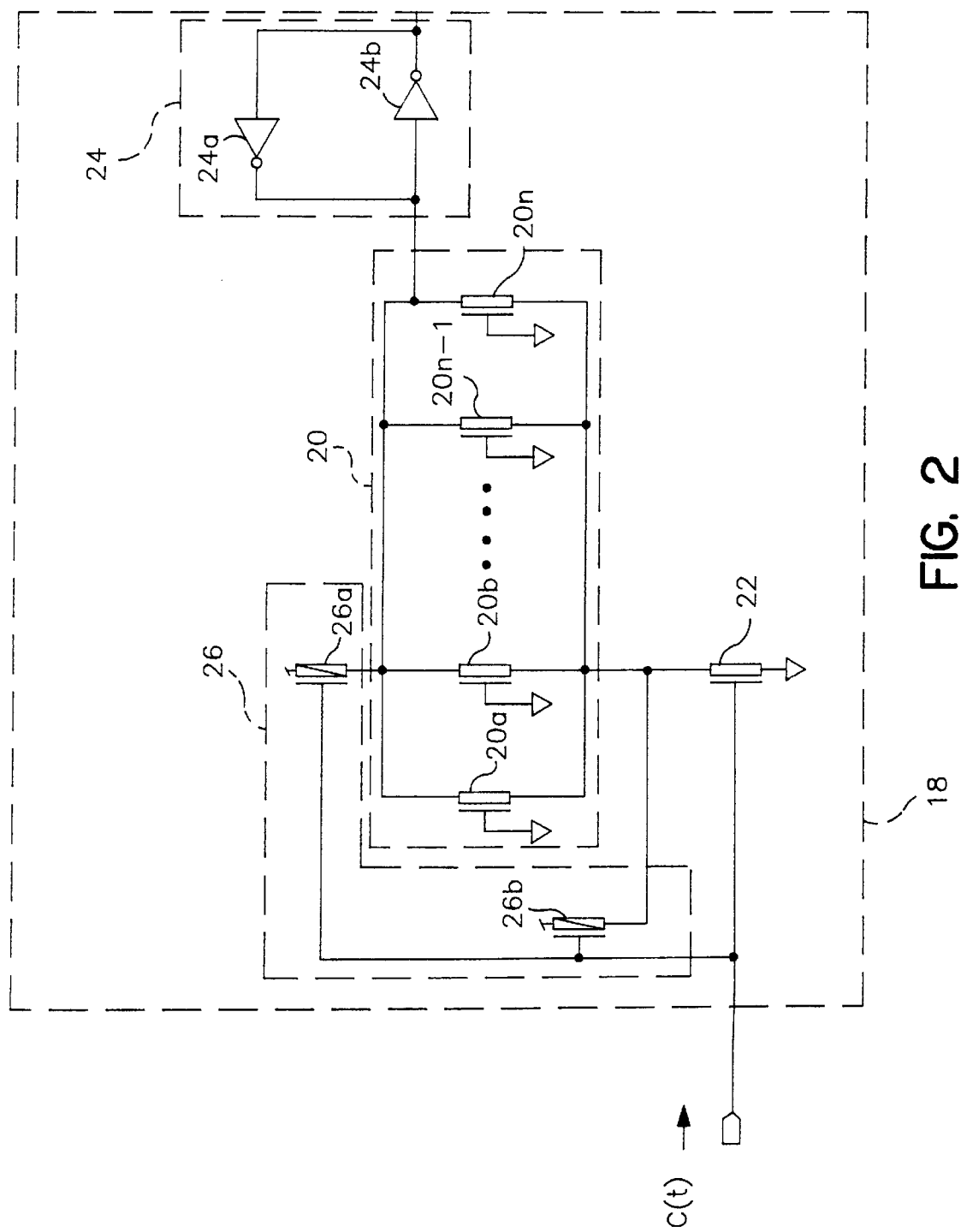
FIG. 2 illustrates an exemplary embodiment of the monitor system of the present invention.

FIG. 2 illustrates an exemplary embodiment of monitor system 18 according to the present invention. Monitor system 18 includes monitor device 20, monitor discharge circuit 22, latch 24, and monitor bias circuit 26, as described above with reference to FIG. 1. According to this exemplary embodiment, monitor device 20 includes a plurality of SOI transistors $20a$–$20n$ coupled together in a multiplexed configuration. In this configuration, the sources of SOI transistors $20a$–$20n$ are coupled together and to monitor discharge circuit 22, which is typically an nFET, as illustrated in FIG. 2, or a pFET depending on the polarity of the desired implementation. The drains of SOI transistors 20a-20n are coupled together and to latch 24 and to monitor bias circuit 26. The gates of SOI transistors $20a$–$20n$ are coupled to ground, as illustrated in FIG. 2, or may be allowed to float. Configuring the plurality of SOI transistors $20a$–$20n$ as such ensures that body charge of monitor device 20 is representative of monitored SOI device 30 such that latch 24 activates second discharge circuit 16 when the body potential of monitored SOI device 30 has reached the predetermined level and the control signal is in its second state.

Latch 24 is represented by inverters $24a$ and $24b$ configured as illustrated in the exemplary embodiment of FIG. 2. In particular, the output of inverter $24a$ is coupled to the input of inverter $24b$, both of which are coupled to monitor device 20. The input of inverter $24a$ is coupled to the output of inverter $24b$. When control signal C(t) is in the second state, and when the body charge of monitor device 20 reaches a level comparable to the predetermined level of body charge of monitored SOI device 30, monitor discharge circuit 22 is activated to conduct the body charge of SOI transistors $20a$–$20n$ to ground, causing a voltage drop at the node between monitor device 20 and latch 24. As explained above, only if the magnitude of this voltage drop equals or exceeds a threshold amount of voltage required to cause latch 24 to register a logical "0" (or logical "1" depending on the desired implementation), does latch 24 activate second discharge circuit 16. This threshold voltage of latch 24 will depend on the transfer characteristics of inverters $24a$ and $24b$ which, in turn, depend on the characteristics of the transistors used to implement these devices.

According to the exemplary embodiment illustrated in FIG. 2, monitor bias circuit 26 includes bias transistors $26a$ and $26b$. Bias transistors $26a$ and $26b$ are preferably PFETS, as illustrated in FIG. 2. The respective gates of bias transistors $26a$ and $26b$ are coupled together and are responsive to control signal C(t). The drain of transistor $26a$ is coupled to the drains of SOI transistors $20a$–$20n$. The drain of transistor $26b$ is coupled to the sources of SOI transistors $20a$–$20n$ and to monitor discharge circuit 22. According to this configuration, the gates of bias transistors $26a$ and $26b$ are responsive to the control signal C(t) such that, in the first state of control signal C(t), the drains of bias transistors $26a$ and $26b$ act to set the body potential of SOI transistors $20a$–$20n$. In the second state of control signal C(t), as explained above, control signal C(t) causes monitor bias circuit 26 to be inactive, such that monitor bias circuit 26 ceases setting the body charge of monitor device 20.

If, during operation, the cycle time of the control signal is sufficiently short such that the body of monitored SOI device 30 does not accumulate the predetermined level of body charge within a cycle, the bodies of SOI transistors 20a–20n should similarly fail to accumulate a level of body charge sufficient to cause latch 24 to register a logical "0" when monitor discharge circuit 22 conducts the body charges of SOI transistors 20a–20n to ground. Consequently, for that particular cycle, monitor system 18 will fail to activate second discharge circuit 16. If, however, the cycle time of the control signal is sufficiently long such that the bodies of SOI transistors 20a–20n are charged by monitor bias circuit 26, sufficient transient bipolar current flows through SOI transistors 20a20n to cause a sufficient voltage drop at the node at which the drains of SOI transistors 20a–20n are coupled to latch 24. This causes latch 24 to register a logical "0" thus activating second discharge circuit 16.

Figure 3:
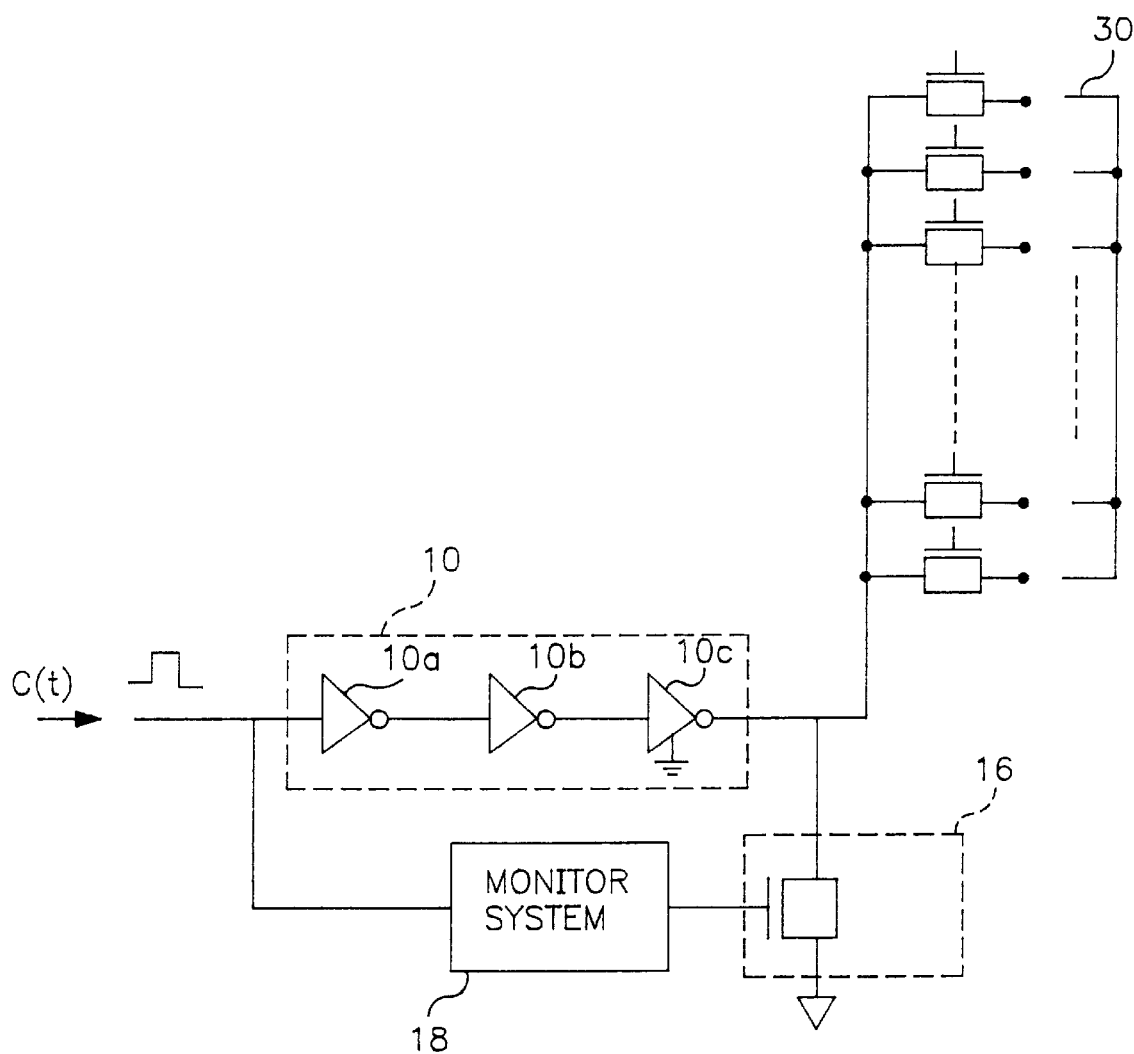
FIG. 3 illustrates an apparatus for discharging a plurality of monitored SOI transistors according to a second exemplary embodiment of the present invention.

Another exemplary embodiment of an apparatus for discharging a plurality of monitored SOI transistors 30 with charged bodies, constructed in accordance with the present invention, is illustrated in FIG. 3. FIG. 3 is similar to FIGS. 1 and 2 in most respects. However, FIG. 3 illustrates the present invention as adapted for discharging a plurality of SOI transistors 30 which carry a cumulative body charge. FIG. 3 also illustrates the internal circuitry of first discharge circuit 10 and second discharge circuit 16, according to one exemplary embodiment of the present invention.

According to the exemplary embodiment illustrated in FIG. 3, first discharge circuit 10 includes a plurality of inverters 10a, 10b, and 10c, coupled in series. The rightmost inverter in FIG. 3 has a path to ground, through which cumulative body charge of SOI transistors 30 is conducted to ground when control signal C(t) is in the first state. Second discharge circuit 16 illustrated in FIG. 3 includes a single nFET. According to alternative embodiments, second discharge circuit 16 may include one or more nFETs, one or more pFETs, or a logic block depending on signal polarities or, generally, the desired implementation.

One of the advantages of the apparatus according to the present invention is that the body charge of SOI transistors 30 can be prevented from reaching a high level thereby avoiding excessive parasitic bipolar current on discharge. This may be accomplished by implementing latch 24 with transistors having threshold voltages such that the corresponding predetermined level, at which second discharge circuit 16 activates, is such that the excess body charge is conducted to ground before a high level of body potential is reached. Because the discharging apparatus according to the present invention provides for the body charge of SOI transistors 20a–20n to be repeatedly grounded as control signal C(t) cycles between the first and second states, the body charge of monitored SOI transistors 30 can be controlled even during prolonged periods of operation and/or with high potentials at the source and drain.

In addition, because the body charge of the monitored SOI transistors 30 is controlled during subsequent switching of the source or drain, unwanted and unexpected transient bipolar behavior of monitored SOI transistors 30 can be avoided. This prevents additional problems of unmonitored SOI circuits from arising, including speed degradation, functionality errors, and, even after an initial discharge of the body charge of monitored SOI transistors 30, unwanted and unexpected additional discharge occurring during subsequent cycles if enough body charge accumulates again on the body of the SOI transistors. The apparatus according to the present invention also generally improves operating noise margin and improves overall circuit robustness.

Although illustrated and described herein with reference to certain specific embodiments, the present invention is nevertheless not intended to be limited to the details shown. Rather, various modifications may be made in the details within the scope and range of equivalents of the claims and without departing from the spirit of the invention.

What is claimed is:

1. A method of discharging a monitored SOI device with a charged body, the method comprising the steps of:

(a) coupling a first discharge circuit to the monitored SOI device;

(b) coupling a second discharge circuit to the monitored SOI device;

(c) discharging the body of the monitored SOI device through the first discharge circuit to ground;

(d) determining when the body charge of the monitored SOI device reaches a predetermined level; and (e) selectively activating the second discharge circuit to discharge the body of the monitored SOI device through the second discharge circuit to ground when the body charge of the monitored SOI device has reached the predetermined level.

2. The method according to claim 1 wherein step (d) includes:

providing a monitor device adapted to accumulate charge on its body comparable to that which accumulates on the body of the monitored SOI device, and emulating the accumulation of body charge of the monitored SOI device by the accumulation of body charge on the monitor device.

3. The method according to claim 2 wherein step (d) further includes:

conducting the body charge of the monitor device to ground, and detecting when the body charge of the monitor device conducted to ground is of an amount comparable to the predetermined level to selectively activate the second discharge circuit.

4. The method according to claim 2 wherein step (d) further includes setting the body potential of the monitor device with a monitor bias circuit in response to the control signal.

5. The method according to claim 1 wherein the predetermined level at which the body charge of the monitored SOI device is conducted to ground through the second discharge circuit is one at which the body charge of the monitored SOI device cannot be conducted to ground entirely by the first discharge circuit within normal operating cycle time allowances.

* * * * *